United States Patent [19]
Marble et al.

[11] Patent Number: 5,643,460
[45] Date of Patent: Jul. 1, 1997

[54] METHOD FOR SEPARATING OIL FROM WATER IN PETROLEUM PRODUCTION

[75] Inventors: Robert A. Marble, Sugarland, Tex.; Manian Ramesh, Lisle, Ill.; Norman Edward Byrne, Dibden Purlieu, United Kingdom

[73] Assignee: Nalco/Exxon Energy Chemicals, L. P., Sugarland, Tex.

[21] Appl. No.: 497,359

[22] Filed: Jun. 30, 1995

Related U.S. Application Data

[63] Continuation-in-part of Ser. No. 182,300, Jan. 14, 1994, abandoned.

[51] Int. Cl.$^6$ .................................................. C02F 1/56
[52] U.S. Cl. .................. 210/705; 166/267; 208/188; 210/708; 210/727; 210/734; 210/737; 252/341; 252/358
[58] Field of Search ................................ 166/266, 267; 208/188; 210/705, 708, 725, 727, 278, 274, 737; 252/341, 358

[56] References Cited

U.S. PATENT DOCUMENTS

| | | | |
|---|---|---|---|
| 3,707,464 | 12/1972 | Burns et al. | 210/705 |
| 4,152,274 | 5/1979 | Phillips et al. | 252/8.55 |
| 4,380,600 | 4/1983 | Hosoda et al. | 524/458 |
| 4,466,885 | 8/1984 | Ronden | 210/708 |
| 4,699,951 | 10/1987 | Allenson et al. | 525/194 |
| 4,929,655 | 5/1990 | Takeda et al. | 524/458 |
| 5,006,590 | 4/1991 | Takeda et al. | 524/458 |
| 5,021,167 | 6/1991 | Braden et al. | 210/708 |
| 5,128,046 | 7/1992 | Marble et al. | 210/705 |
| 5,183,576 | 2/1993 | Wood et al. | 210/734 |
| 5,330,650 | 7/1994 | Byrne et al. | 210/708 |

*Primary Examiner*—Peter A. Hruskoci
*Attorney, Agent, or Firm*—James J. Drake; Robert A. Miller

[57] ABSTRACT

A method for separating emulsified oil from water in petroleum production is disclosed. Low molecular weight polymers of dimethylaminoethyl acrylate methyl chloride and benzyl chloride quaternary salt have good activity as reverse emulsion breakers for freeing oil tied up as a oil-in-water emulsion. The polymer reverse emulsion breakers are preferably prepared and used as aqueous solutions to obviate the need for inversion techniques and the use of hydrocarbon compatibilizers and surfactants as required for a latex polymer.

8 Claims, 1 Drawing Sheet

METHOD FOR SEPARATING OIL FROM WATER IN PETROLEUM PRODUCTION

BACKGROUND OF THE INVENTION

Reference to Related Patent

The present application is a continuation-in-part of application Ser. No. 08/182,300 filed Jan. 14, 1994 now abandoned by Robert A. Marble, et at., entitled "Method for Separating Oil from Water in Petroleum Production", the disclosure of which is incorporated herein by reference.

1. Field of the Invention

The present invention relates to a method for separating emulsified oil from water in petroleum production. More particularly, the present invention relates to a method for breaking an oil-in-water emusion in oil field production water using a low molecular weight, water-soluble, cationic polymer reverse emulsion breaker comprising dimethylaminoethyl acrylate methyl chloride and/or benzyl chloride quaternary salts.

2. Description of the Prior Art

Cationic polymer additives comprising dimethylaminoethyl (meth)acrylate methyl chloride and/or benzyl chloride quaternary salts are known for various purposes in the art. Wood et al. U.S. Pat. No. 5,183,576 describes the use of a low molecular weight homopolymer of dimethylaminoethyl methacrylate quaternary salt as a dewatering agent for treating sludge produced from the treatment of chemical and pharmaceutical plant waste water.

Dimethylaminoethyl methacrylate quaternary salts have also been copolymerized with other cationic monomers or acrylamide to form useful cationic polymer additives. Phillips et al. U.S. Pat. No. 4,152,274 describes the use of copolymers of acrylamide and quaternary salts of a dimethylaminoethyl methacrylate or a dimethylaminopropyl methacrylate as a friction reducing additive in an aqueous well fracturing drilling fluid.

Aqueous dispersions of cationic copolymer are known from Takeda et al. U.S. Pat. No. 4,929,655 and U.S. Pat. No. 5,006,590. Takeda et al. '655 describes a process for making a water soluble, cationic copolymer dispersion wherein water soluble cationic monomers are polymerized in the presence of an organic high-molecular weight multivalent cation dissolved in an aqueous multivalent anionic salt solution. The polymerization technique is said to obtain a polymer in the form of fine particles dispersed in the aqueous multivalent anionic salt solution. Takeda et al. '590 describes the preparation of an aqueous copolymer dispersion wherein the copolymer contains acrylic dialkyl benzylammonium groups dissolved in an aqueous solution of a polyvalent anion salt.

Hosoda et al. U.S. Pat. No. 4,380,600 describes an aqueous dispersion of water soluble polymer composition having good stability and fluidity. The aqueous dispersion is produced by polymerizing an ethylenically unsaturated monomer capable of forming a water soluble polymer in an aqueous solution containing a water soluble polymer.

As far as Applicants are aware, low molecular weight polymers of dimethylaminoethyl acrylate benzyl chloride and methyl chloride quaternary salts have not previously been used as a reverse emulsion breaker in petroleum production.

SUMMARY OF THE INVENTION

Aqueous solutions of water soluble, cationic polymers of methyl chloride and benzyl chloride quaternary salts of dimethylaminoethyl acrylate are efficient reverse emulsion breakers for oil field water even at low molecular weights.

In one embodiment, the present invention provides a method for separating produced oil from water of an oil production field. An oil field production stream comprising oil as an oil-in-water emulsion is treated with a reverse emulsion breaker agent comprising a low molecular weight, water soluble, cationic polymer consisting essentially of a polymerized dimethylaminoethyl acrylate quaternary salt monomer selected from methyl chloride quaternary salt, benzyl chloride quaternary salt or a combination thereof to substantially free the oil and produce free oil and water phases, wherein the free oil phase comprises less than about 50 percent by volume water. The free water and oil phases are separated to produce free water and oil streams. The present method can include the step of dehydrating the free oil stream in a heater unit to produce a clean oil product stream and a residual water stream. Alternatively, the production stream is fed to a free water knock out tank to separate free water from the production stream prior to the treating step.

In a preferred embodiment, the polymer reverse emulsion breaker has an intrinsic viscosity of from about 0.2 to about 10 dL/g, more preferably from about 1 to about 5 dL/g. The treating step includes the step of injecting an aqueous solution of the polymer reverse emulsion breaker into the production stream, wherein the aqueous solution has a Brookfield viscosity of less than 6000 cp. The aqueous copolymer solution is made by solution polymerization and has a substantially continuous aqueous phase which is essentially free of compatibilizing hydrocarbon-based components.

The aqueous copolymer solution is dosed at a concentration of from about 0.05 to about 300 parts per million by weight of the copolymer, and preferably at a concentration of from about 0.1 to about 15 parts per million by weight of the copolymer. The method can further comprise the steps of clarifying the free water stream in a gas flotation unit for flocculation and recovery of residual dispersed oil in the free water stream and directing the residual water stream recovered from the free oil dehydration step to the free water clarifying step. The reverse emulsion breaker additive can be a latex emulsion or aqueous dispersion of the polymer.

In another embodiment, the present invention provides an apparatus for separating produced oil from water from a hydrocarbon-bearing formulation of an oil production field. A stream of produced water containing oil substantially as an oil-in-water emulsion is gathered from the production field and received in a free water knock-out tank provided for that purpose. A pump is provided to inject a reverse emulsion breaker additive from an additives tank comprising a change of a low molecular weight, aqueous, cationic polymer consisting essentially of a polymerized dimethylaminoethyl acrylate quaternary salt monomer selected from methyl chloride quaternary salt, benzyl chloride quaternary salt or a combination thereof, into the production stream to substantially break the oil-in-water emulsion and produce a free oil phase comprising less than about 50 percent by weight water and a free water phase. A stream from the free oil phase is dehydrated in a heater treater to produce a clean oil product stream and a residual water stream. A stream from the free water phase from the knock-out tank and the residual water stream from the heater treater are clarified in a flotation unit to form a foamed oil phase comprising greater than 50 percent by weight water and a clarified water phase. The clarified water phase from the flotation tank is removed though a line for reinjection into the formation. The foamed oil phase is drawn off through another line, optionally, for further clean up, recycle to the clean oil product stream, or use as a fuel. There is preferably provided a holdup vessel for receiving the free water stream from the knock-out tank and the residual water stream from the heater treater for supply to the flotation unit. The polymer reverse emulsion breaker preferably has an intrinsic viscosity of from about 0.2 to about 10 dL/g, more preferably from about 1 to about 5 dL/g. The polymer reverse emulsion breaker is used as an aqueous solution. The polymer solution can be made by solution polymerization and has a substantially continuous aqueus phase which is essentially free of compatibilizing hydrocarbon-based components.

BRIEF DESCRIPTION OF THE DRAWINGS

The FIGURE is a schematic diagram of the oil separation method of the present invention.

DESCRIPTION OF THE PREFERRED EMBODIMENTS

Figure 1:
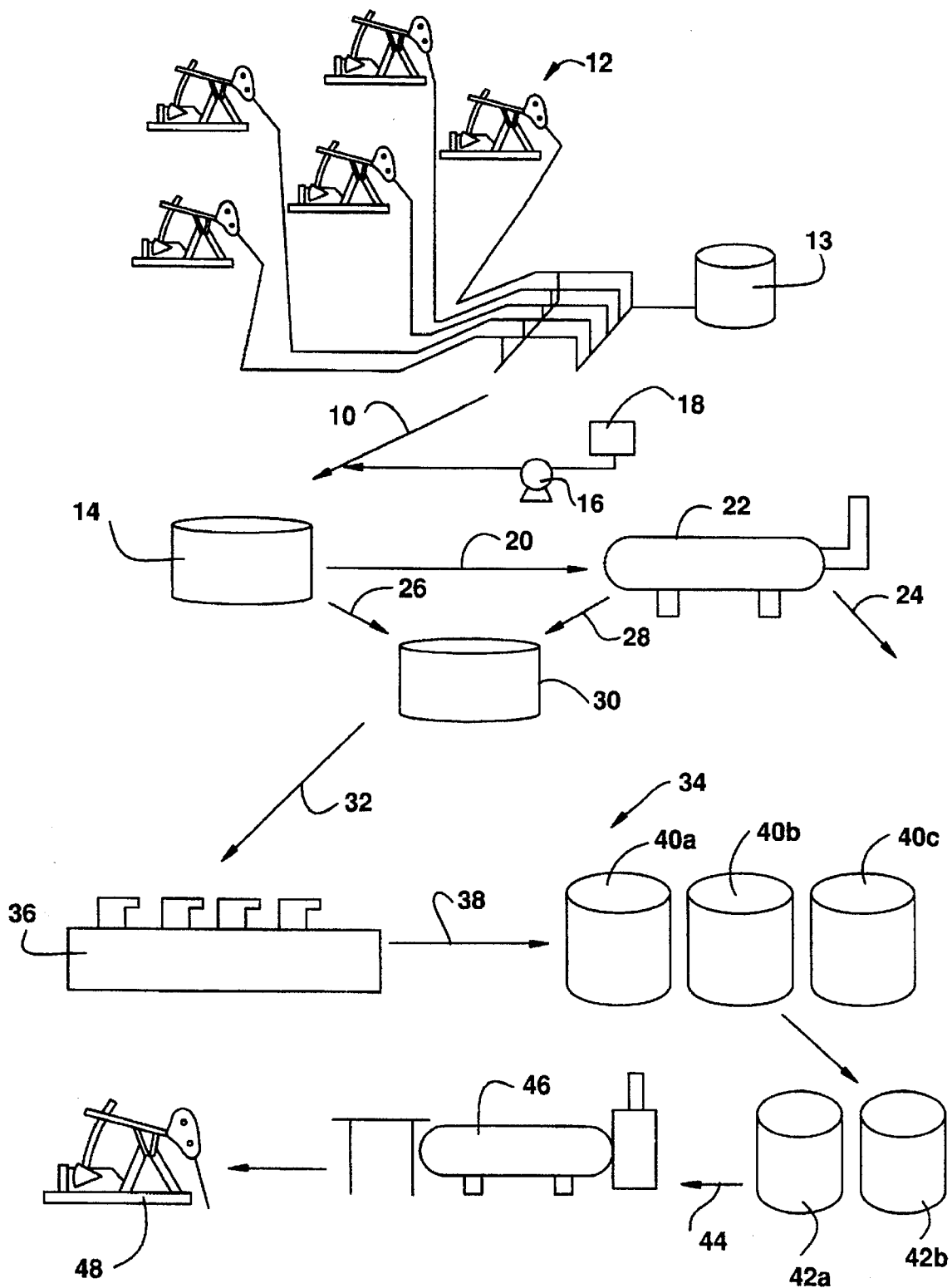

Low molecular weight, water soluble, cationic polymers of dimethylaminoethyl acrylate (DMAEA) methyl and benzyl chloride quaternary salts have surprising activity as reverse emulsion breakers for separating emulsified oil from produced water in petroleum production.

The polymer reverse emulsion breakers useful in the present invention consist essentially of a dimethylaminoethyl acrylate quaternary salt monomer selected from methyl chloride quaternary salt (DMAEA.MCQ), benzyl chloride quaternary salt (DMAEA.BCQ), or combinations thereof. The present reverse emulsion breaker preferably contains 90 percent by weight or more of either or both of DMAEA.MCQ and DMAEA.BCQ.

The reverse emulsion breaker polymers can also contain a minor proportion, preferably 10 percent by weight or less of additional cationic monomers or nonionic monomers such as acrylamide; other quaternary salts of DMAEA such as dimethylaminoethyl acrylate methyl sulfate quaternary salt, hydrogen sulfate quaternary salt, and the like; methyl chloride and benzyl chloride quaternary salts of dimethylaminoethyl methacrylate (DMAEA.MCQ and DMAEA.BCQ); and the like.

The DMAEA quaternary salt polymers can have an intrinsic viscosity of from about 0.2 to about 10 dL/g as determined in 1M sodium nitrate at 30° C., 1 weight percent polymer solution. However, low molecular weight polymers are preferred for ease of pumping and the DMAEA quaternary salt polymers have a preferred intrinsic viscosity of from about 1 to abut 5 dL/g and more preferably from about 2 to about 4 dL/g.

The DMAEA quaternary salt polymers can be prepared by conventional means known in the art including latex emulsion, solution, suspension or bulk polymerization techniques. Aqueous solutions of the polymers are preferably prepared by dissolving the DMAEA quaternary salt monomer(s) in deionized water. The reaction solution is then heated to a temperature on the order of 50° C. and a suitable water soluble free radical initiator exemplified by a combination of ammonium persulfate/sodium bisulfate (SBS) is added. The solution polymerization reaction typically can proceed substantially until completion or for a sufficient time to give the present polymer at a desired molecular weight as an aqueous solution. Additional molecular weight control can be obtained by adjusting the concentration of the initiator up or down as desired to reduce or increase molecular weight, or use of a chain transfer agent such as benzyl alcohol or sodium bisulfite alone. Concentration of monomer(s) in the reaction mixture will typically range from about 10 to about 30 percent by weight of the reaction mixture to produce the aqueous solution polymer having a polymer actives concentration between 10–30 percent by weight of the solution.

The present aqueous copolymer solutions preferably have a Brookfield viscosity of from about 100 cp to about 6000 cp, and more preferably from about 500 cp to abut 2500 cp.

The present polymer reverse emulsion breaker additive can be added as a dry powder to the field production stream prior to any water separation step to substantially free oil emulsified in the water. Alternatively, the polymer reverse emulsion breaker can be added to the production stream as an inverted latex emulsion as known in the art to obtain good dispersion of a latex emulsion in an aqueous stream. Preferably, however, the present polymer reverse emulsion breaker is added to the production stream as an aqueous solution.

The present aqueous solution reverse emulsion breaker additive can include other components such as antifreeze agents, biocides, and the like.

Referring to the FIGURE, the aqueous solution of the polymer reverse emulsion breaker is added to a production stream 10 from oil field wells 12 (having an automatic well tester tank 13) at a concentration suitable to substantially free oil tied up as an oil-in-water emulsion from the water. Generally, the reverse emulsion breaker additive is injected into production stream upstream of a free water knock-out tank 14 by a metering pump 16. Due to the nature of the polymer solution as a continuous aqueous phase, the present reverse emulsion breaker solution can be fed to the pump 16 from a feed tank 18 of the additive either neat or suitably diluted without any preliminary mixing or inversion steps. The present polymer reverse emulsion breaker is preferably introduced at a dosage of about 0.05 to about 300 parts per million by weight of the polymer, but preferably at a dosage of about 0.1 to about 15 parts per million by weight of the polymer.

In the free water knock-out tank 14, oil released from the oil-in-water emulsion agglomerates and rises to the top as a free oil phase. While the production stream 10 can contain a full range of water-oil ratios, the free oil phase produced by the reverse emulsion breaker will still contain from about 10 to about 50 percent by volume water therein generally as a water-in-oil emulsion and a dispersed water droplet phase. A wet free oil stream 20 removed from the tank 14 is passed to a heater treater 22 wherein the oil is substantially dehydrated at elevated temperatures using suitable emulsion breakers and/or coagulators and flocculators as known in the art. Clean oil having a water content of about 0.2 percent by volume to about 3 percent by volume is removed through line 24.

A free water stream 26 produced in the knock-out tank 14 and a residual water stream 28 produced in the heater treater 22 are directed to a holdup vessel 30 for feed through line 32 to a water treatment facility 34. The treatment facility 34 clarifies the produced water for reuse in the wells 12. The treatment facility 34 typically comprises a flotation unit 36 such as a Wemco wherein air is used to advance the coalescence of dispersed oil particles in the water and produce an oil froth or foamed phase at the top and a clarified water phase at the bottom. Water clarification in the flotation unit 36 can include the use of chemical emulsion breakers, flocculants, coagulants as known in the art to assist the clarification process. A foamed oil stream (not shown) is removed from the flotation unit 36 for cleanup and recycle to the clean oil stream 24 or can be used as a fuel, i.e., A clarified water stream 38 is directed to filters 40a, 40b, 40c for removal of sediments, and then to softener units 42a, 42b to remove dissolved salts. A softened, clarified water stream 44 can be then used as feed water for a steam generator 46 and/or reinjected into the formation at an injection well 48.

Alternatively, free water in the production stream 10 can be separated in the free water knock-out tank 14 prior to introduction of the polymer reverse emulsion breaker. Thus, breaking of the oil-in-water phase and separation of the resulting free oil and water phases takes place in the heater treater unit 22 wherein the free oil stream is also substantially dehydrated as mentioned above.

The present invention can be further described by reference to the following examples.

EXAMPLE 1

A 25% actives aqueous solution of a low molecular weight DMAEA.MCQ polymer was prepared in a 1.5 liter batch reactor equipped with a stirrer, thermocouple, reflux condenser, and nitrogen purge. DMAEA.MCQ monomer (305.62 g of 81.8% actives in water) was dissolved in 680.28 g of deionized water along with 10.00 g adipic acid for preventing the decomposition of acrylate esters. The reaction mixture was then degassed by purging with nitrogen for 30 minutes and heated to 50° C. with constant stirring at 500 rpm. Ammonium persulfate free radical initiator (4.00 g of 1 weight percent solution in water) was added and the reaction proceeded with stirring at 50° C. for 4 hours. The reactor was cooled to room temperature and the contents were transferred to a container for evaluation. The product was characterized by measurement of an intrinsic viscosity (IV) (1M $NaNO_3$ solution, 1 weight percent polymer solution), colloidal titrate (0.0025 g product against 0.0002N potassium salt of polyvinyl sulfuric acid (PVSK)), and residual monomer concentration.

EXAMPLE 2

A DMAEA.MCQ homopolymer was prepared as a 25% actives aqueous solution similar to Example 1 except that the initiator system was 1000 ppm by weight 2,2'-azobis(2-amidinopropane) hydrochloride and 100 ppm by weight sodium bisulfite (SBS) chain transfer agent (to moderate the initiator action for molecular weight control). The Azo-SBS initiators were mixed and added concurrently to the reaction mixture. The reaction completion time was 5 hours and the stirrer was not used. Conversion rate was 99.4% and IV was 1.88 dL/g (0.49 weight percent polymer concentration using 1M $NaNO_3$ solution). Bulk solution viscosity for 22% actives was 22,600 cp and solution viscosity for 0.5% actives was 35.0 cp.

EXAMPLES 3–13

Aqueous solutions (10–25% actives) of low molecular weight homopolymers of DMAEA.MCQ and DMAEA.BCQ, and a 50/50 mole percent copolymer of DMAEA.MCQ/DMAEA.BCQ prepared similarly to Examples 1–2 were bottle tested in the field for reverse emulsion breaking activity. Testing was performed at 5 different production fields in southern California.

Briefly, the bottle test procedure consisted of sampling produced water containing emulsified oil (7–18 liters). A 175 ml prescription bottle was filled to the 100 ml mark with the produced water, capped and inverted to coat the bottle walls. An appropriate amount of reverse emulsion breaker to be tested was dosed by pipet from freshly prepared 1 weight percent solution in distilled water. The dosed bottles were hand shaken several times for agitation. Agitation procedure consisted of slow rolls, easy shakes or hard shakes as matching the system conditions. Agitation was done in sets and the mixtures were visually graded after each set.

Observations such as water clarity, unbroken emulsion, dispersed oil droplets and relative densities of oil left in the water were reduced to quick numerical grades of 1–10 with 10 being the best. In addition, IR analysis was undertaken for some of the samples to determine residual oil remaining in the treated water. Several sets of agitation were done in quick succession to avoid cooling and aging the emulsion. Among the qualities included in the grade were speed of water clarification, the size and persistency of the floc and the relative clarity of the water. Results are given in Tables 1 and 2.

TABLE 1

| Polymer Reverse Emulsion Breaker | Description |
| --- | --- |
| A | Aqueous solution of poly(DMAEA.MCQ) 25 weight percent actives - 2.73 dL/gm (IV) |
| B | Aqueous solution of poly(DMAEA.BCQ) 10 weight percent actives - 3.4 dL/gm (IV) |
| C | Aqueous solution of 50/50 mole percent poly(DMAEA.MCQ/DMAEA.BCQ) 10 weight percent actives - 3.8 dL/gm (IV) |

TABLE 2

| Ex. | Field | Water Temp °C. | Breaker Type | Breaker conc. (PPM) | Agitation Number | Agitation Type | Grade | Oil Conc. by IR (PPM) |
| --- | --- | --- | --- | --- | --- | --- | --- | --- |
| 3 | A | 50 | A | 30 | 10 | easy rolls | 7 | |
| | | | | 30 | 50 | hard shakes | 7 | |
| 4 | A | 50 | A | 50 | 50 | easy shakes | 10– | |
| | | | | 50 | 100 | hard shakes | 9 | |
| 5 | B | | A | 70 | 100 | hard shakes | 8 | |
| | | | | 70 | 200 | hard shakes | 8 | |
| 6 | B | | A | 90 | 100 | hard shakes | 3 | |
| | | | | 90 | 200 | hard shakes | 5 | |
| | | | | 90 | 300 | hard shakes | 6 | |
| 7 | C | | A | 60 | 100 | hard shakes | 7 | |

TABLE 2-continued

| Ex. | Field | Water Temp °C. | Breaker Type | Breaker conc. (PPM) | Agitation Number | Agitation Type | Grade | Oil Conc. by IR (PPM) |
|---|---|---|---|---|---|---|---|---|
| | | | | 60 | 200 | hard shakes | 8 | |
| | | | | 90 | 100 | hard shakes | OT | |
| | | | | 90 | 200 | hard shakes | 6 | |
| | | | | 120 | 100 | hard shakes | OT | |
| | | | | 120 | 200 | hard shakes | 0 | |
| 8 | C | | A | 20 | 100 | hard shakes | 0 | >500 |
| | | | | 20 | 100 | hard shakes | 0 | >500 |
| | | | | 40 | 100 | hard shakes | 7 | 57 |
| | | | | 40 | 100 | hard shakes | 7 | — |
| | | | | 60 | 100 | hard shakes | 7 | 68 |
| | | | | 60 | 100 | hard shakes | 7 | — |
| | | | | 90 | 100 | hard shakes | 8 | 90 |
| | | | | 90 | 100 | hard shakes | 7 | — |
| | | | | 120 | 100 | hard shakes | 6 | 142 |
| | | | | 120 | 100 | hard shakes | 7 | — |
| 9 | C | | A | | | | | 113 |
| 10 | D | 54 | A | 2 | 10 | easy rolls | 7 | |
| | | | | 2 | 50 | hard shakes | 7 | |
| | | | | 2 | 50 | easy shakes | 10− | |
| | | | | 1 | 100 | hard shakes | 9 | |
| | | | | 1 | 100 | hard shakes | 8 | |
| | | | | 1 | 200 | hard shakes | 8 | |
| | | | | 1 | 100 | hard shakes | 3 | |
| | | | | 1 | 200 | hard shakes | 5 | |
| | | | | 1 | 300 | hard shakes | 6 | |
| 11 | E | 54 | A | 3 | 100 | hard shakes | 7 | |
| | | | | 3 | 200 | hard shakes | 8 | |
| | | | | 3 | 100 | hard shakes | OT | |
| | | | | 5 | 200 | hard shakes | 6 | |
| | | | | 5 | 100 | hard shakes | OT | |
| | | | | 5 | 200 | hard shakes | 0 | |
| 12 | E | 54 | B | 5 | 100 | hard shakes | 0 | >500 |
| | | | | 5 | 100 | hard shakes | 0 | >500 |
| | | | | 5 | 100 | hard shakes | 7 | 57 |
| 13 | E | 54 | C | 5 | 100 | hard shakes | 7 | — |
| | | | | 5 | 100 | hard shakes | 7 | 68 |
| | | | | 5 | 100 | hard shakes | 7 | — |

OT — Overtreat.

EXAMPLE 14

Tests were run in California on the polymers. The results showed that DMAEA.MCQ has very good reverse emulsion breaking properties. The DMAEA.MCQ was better than non-quaternary DMAEM as seen in comparisons with a competitive product CCP-II. DMAEA.BCQ appears to be slightly better than the non-quaternary DMAEM, but not as effective as the DMAEA.MCQ. The solution polymer DMAEA.MCQ has very good reverse emulsion breaking properties. Now we have some data to prove it.

| Experimental | Composition |
|---|---|
| Polymer A | DMAEA.MCQ |
| Polymer B | DMAEA.BCQ |
| Polymer C | AcAm/DMAEA.MCQ |

Polymer A consistently has shown good reverse emulsion breaking ability when compared to Triethanolamine Condensate—MCQ Quat. The Triethanolamine Condensate—MCQ Quat has been the standard reverse emulsion breaker in this area.

| Product | Activity | Chemistry |
|---|---|---|
| Polymer A | 20% | DMAEA.MCQ |
| Polymer D | 34.5% | Triethanolamine condensate -MCQ |
| Polymer E | 45% | DMA/Epi-NH3 |
| Polymer F | 50% | DMA/Epi Linear |

The other common chemistry used for reverse emulsion breaking is found in products which are based on hexamethylenediamine bottoms. This chemistry is not as efficient as the Triethanolamine Condensate—MCQ Quat. The testing that shows the ability of Polymer A is shown below. The ratings are visual observations on a scale of 1–10 with 10 being best made after shaking the dirty water and chemical mixture. After each agitation the bottles are rated. Normally the water tends to get cleaner after each agitation.

| Product | PPM | Rating #1 | Rating #2 | Rating #3 | Rating #4 |
|---|---|---|---|---|---|
| Polymer A | 2 | 4 | 5 | | |
| | 4 | 7 | 8 | | |
| | 6 | 10 | 10 | | |
| | 8 | 10 | 10 | | |
| Polymer D | 1 | 0 | 1 | 1 | |
| | 2 | 0 | 2 | 3 | |

-continued

| Product | PPM | Rating #1 | Rating #2 | Rating #3 | Rating #4 |
|---|---|---|---|---|---|
| | 4 | 0 | 4 | 5 | |
| | 6 | 0 | 5 | 6 | |
| Polymer A | 4 | 7 | 8 | 8 | 8 |
| Polymer E | 4 | 4 | 6 | 7 | 7 |
| Polymer F | 4 | 4 | 4 | 7– | 8+ |
| Polymer D | 4 | 4 | 6 | | |
| Polymer A | 5 | 5 | 7 | 7 | |
| Polymer E | 5 | 4 | 10 | 10 | |
| Polymer F | 5 | 3 | 6 | 8 | |

It appears Polymer A is not quite as good as Polymer F until the activity is taken into account and then Polymer A is shown to be the best. The first test shows that Polymer A gives excellent (10) water quality at 6 ppm. The second test shows Polymer D is still struggling to give good water quality at 6 ppm. The third test shows Polymer A is equivalent to slightly better than Polymers D, E and F at 4 ppm. The fourth test shows Polymer E is able to give excellent water quality at 5 ppm. Only 5 ppm Polymer E is required to equal the performance of 6 ppm Polymer A. Combining the above tests and factoring in the activities, the following activity performance comparison can be made.

| Product | Dosage | Activity | ppm Active | Ratings | | | |
|---|---|---|---|---|---|---|---|
| Polymer E | 4 | 45% | 1.8 | 4 | 6 | 7 | 7 |
| Polymer E | 5 | 45% | 2.25 | 4 | 10 | 10 | |
| Polymer F | 4 | 50% | 2.0 | 4 | 4 | 7– | 8+ |
| Polymer F | 5 | 50% | 2.5 | 3 | 6 | 8 | |
| Polymer D | 4 | 34.5% | 1.38 | 0 | 4 | 5 | |
| Polymer D | 6 | 34.5% | 2.07 | 0 | 5 | 6 | |
| Polymer A | 2 | 20% | 0.4 | 4 | 5 | | |
| Polymer A | 4 | 20% | 0.8 | 7 | 8 | | |
| Polymer A | 6 | 20% | 1.2 | 10 | 10 | | |
| Polymer A | 8 | 20% | 1.6 | 10 | 10 | | |

This combined test shows the performance of Polymer A is better than the above best reverse emulsion polyamine chemistries.

The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

Changes can be made in the composition, operation and arrangement of the method of the present invention described herein without departing from the concept and scope of the invention as defined in the following claims:

1. A method for separating produced oil from water in an oil field production stream containing an oil-in-water emulsion, comprising the steps of:

feeding said production stream to a free water knock out tank to separate a free water stream from a free oil stream, dehydrating the free oil stream in a heater treater to produce a clean oil product stream and a residual water stream, and treating said oil field production stream or said free oil stream with an aqueous reverse emulsion breaker agent comprising a water-soluble, cationic polymer consisting essentially of a polymerized dimethylaminoethyl acrylate quaternary salt monomer selected from methyl chloride quaternary salt, benzyl chloride quaternary salt or a combination thereof to substantially free the oil from said production stream or said free oil stream and produce free oil and water phases, wherein the free oil phase comprises less than about 50 percent by volume water, and the polymer has an intrinsic viscosity of from about 1 to about 5 dL/g.

2. The method of claim 1, wherein said treating includes injecting said polymer into said free oil stream.

3. The method of claim 1, wherein the treating step includes the step of injecting an aqueous solution of the polymer reverse emulsion breaker into the production stream, wherein the aqueous solution has a Brookfield viscosity of less than 6000 cp.

4. The method of claim 3, wherein the aqueous polymer solution is dosed at a concentration of from about 0.05 to about 300 parts per million by weight of the polymer.

5. The method of claim 3, wherein the aqueous polymer solution is dosed at a concentration of from about 0.1 to about 15 parts per million by weight of the polymer.

6. The method of claim 3, wherein the aqueous polymer solution is made by solution polymerization, and has a substantially continuous aqueous phase and is essentially free of hydrocarbon-based components.

7. The method of claim 3, wherein the aqueous polymer solution comprises a latex emulsion of the polymer.

8. The method of claim 1, further comprising the step of clarifying the free water stream and the residual water stream in a gas flotation unit for flocculation and recovery of residual oil dispersed therein.

* * * * *